United States Patent

Shorrock

[15] 3,645,419
[45] Feb. 29, 1972

[54] HOOK GUARD AND FLOAT

[72] Inventor: Nelson Shorrock, R.R. #1, Dryden, Ontario, Canada

[22] Filed: Mar. 9, 1970

[21] Appl. No.: 17,728

[52] U.S. Cl. ........................... 220/31 S, 43/44.91, 43/57.5, 220/4 E, 220/35
[51] Int. Cl. ................................. A01k 97/00, B65d 51/10
[58] Field of Search ...................... 220/31 R, 31 S, 35, 4 E; 206/DIG. 6; 43/44.91, 57.5

[56] References Cited

UNITED STATES PATENTS

| | | | |
|---|---|---|---|
| 3,152,716 | 10/1964 | Feldhahn | 220/4 E UX |
| 920,180 | 5/1909 | Potter | 206/DIG. 6 |
| 2,015,999 | 10/1935 | Frank | 220/35 |

FOREIGN PATENTS OR APPLICATIONS

| | | | |
|---|---|---|---|
| 1,773 | 1869 | Great Britain | 206/DIG. 6 |

Primary Examiner—George E. Lowrance
Attorney—Kent & Ade

[57] ABSTRACT

Two substantially hollow spherical portions are normally held closed by a rubberband around the bases of offset manipulative portions. When these portions are pressed together, the two halves open against the pressure of the band so that a fishhook can be inserted or removed from the enclosure. The manipulative portions may be hollow and sealed so that the device can be used as a float also.

1 Claims, 6 Drawing Figures

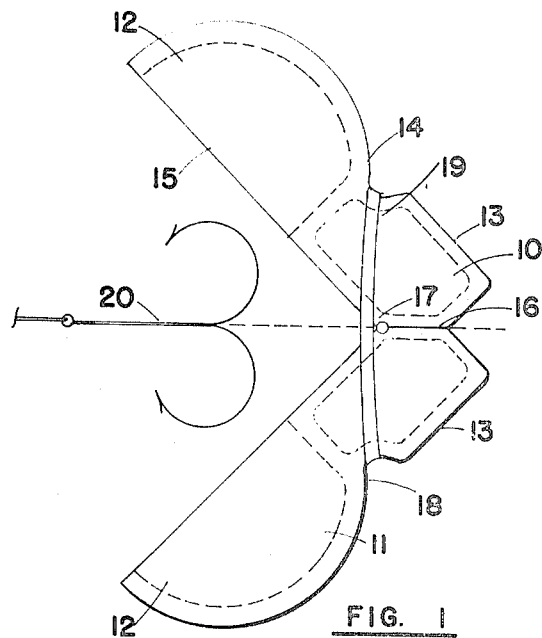
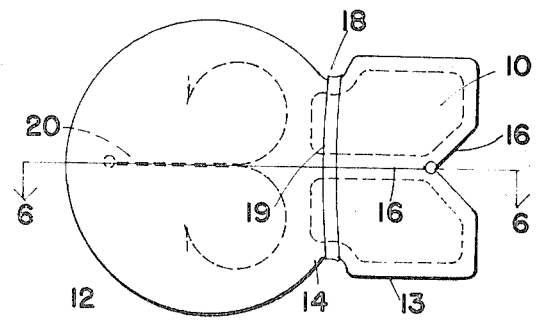
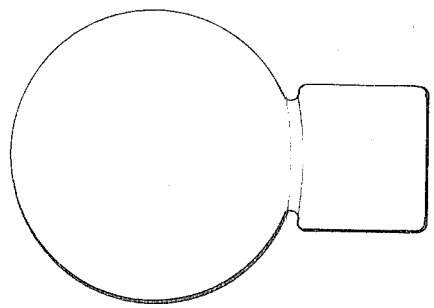
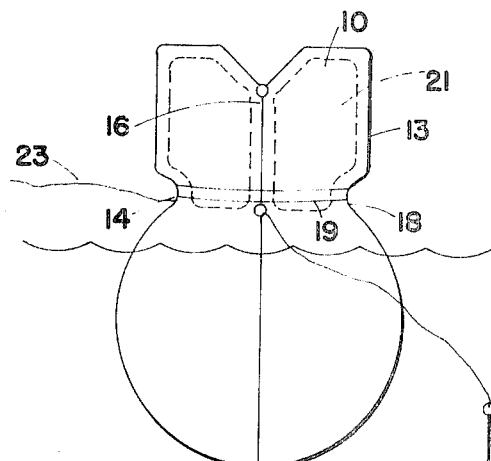
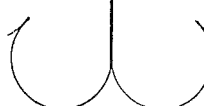
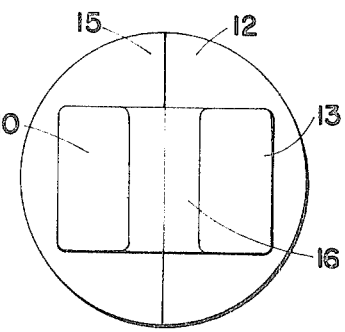
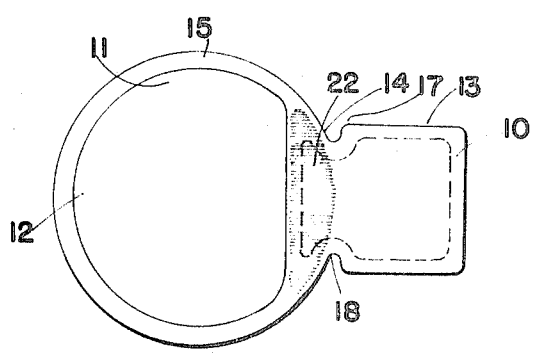

HOOK GUARD AND FLOAT

This invention relates to new and useful improvements in devices to protect fishhooks from damaging the user or from tangling with other gear within tackle boxes or the like.

In the art of angling, relatively large single, double or treble hooks are commonly used and these hooks, to be efficient, must be extremely sharp. It is well known that the barbs on the end of the hooks are provided to prevent disengagement of the hook from the fish when caught. Unfortunately, these barbs also prevent disengagement of the hooks when same inadvertently engage clothing, the flesh of the user, or become entangled with other gear in tackle boxes or the like.

Attempts have been made to protect these barbed ends of hooks such as small pieces of plastic into which the barbs may be inserted. Alternatively, small corks have been used.

However, these methods are awkward and small pieces of material have to be preserved when not in use.

I have overcome these disadvantages by providing a simple, easily manipulated hook guard which consists of two hollow spherical portions having an offset manipulative portion extending therefrom. A rubberband or the like surrounds the two portions adjacent the junction between the spherical portions and the manipulative portions so that when the manipulative portions are pressed together, the spherical parts open so that a fishhook or the like may be inserted or withdrawn. When released, the resilient means such as a rubberband or the like holds the spherical portions closed against inadvertent opening, thus completely enclosing the fishhook and preventing same from causing any damage.

Another object of the invention is to provide sealed air pockets within the manipulative portions so that the device can be used as a float or bobber if desired thus giving a further use to the device.

The device is simple in construction, economical in manufacture, and otherwise well suited to the purpose for which it is desired.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying Figures in which:

FIG. 1 is a side elevation of the device shown in the open position with a fishhook therein.

FIG. 2 is a view similar to FIG. 1 but showing the device in the closed position.

FIG. 3 is a plan view of FIG. 2.

FIG. 4 is a side elevation showing the device used as a float.

FIG. 5 is a top plan view of FIG. 4 with the line removed.

FIG. 6 is a view substantially along the line 6—6 of FIG. 2.

In the drawings like characters of reference indicate corresponding parts in the different figures.

Proceeding therefore to describe the invention in detail, the device consists of two components 10 and 11. Each component is similar in construction and may be manufactured from wood, plastic, hard rubber or the like.

Each component consists of a semispherical hollow part 12 and a manipulative portion 13 extending from one side 14 thereof. It should be observed that the inner surface 15 of the parts 12 and the inner surface 16 of the parts 13 are angulated with respect to one another and in the claims I refer to the plane of the inner surface 16 inclining outwardly from the plane of the inner surface 15. When the two parts are together, the junctions 17 between the inner surfaces 15 and 16 form a fulcrum.

Annular grooves 18 are formed around the outer surfaces of the components adjacent the fulcrum but to the side thereof towards the parts 12 and a resilient or spring device, such as a rubberband or the like 19, is engaged around this groove with sufficient tension to apply constant pressure to the components.

The position of the groove relative to the fulcrum 17 is such that this band normally holds the two parts 12 in the interfacial or closed position shown in FIG. 2 at which time the surfaces 16 of the manipulative portions diverge from one another as clearly shown in FIG. 2.

When it is desired to open the device to the position shown in FIG. 1, the manipulative portions 13 are grasped between the thumb and finger of the user and pressed together thus causing the device to take up the position shown in FIG. 1 against pressure of the resilient band 19. As soon as the portions 13 are released, the rubberband or the like snaps the parts 12 together in the closed position. It will therefore be seen that a hook element 20 can be inserted or removed readily or easily and can be fully protected when the device is in the closed position shown in FIG. 2.

I have found it desirable to provide sealed air pockets 21 within the manipulative portions thus giving flotation characteristics to the device.

The portion 22 of the inner surface 15 of the parts 12 adjacent the fulcrum line 17 is longitudinally striated or serrated so that the associated fishing line 23 may be engaged between the parts 12 adjacent the fulcrum line 17 and be gripped by these serrations when the device is closed thus preventing the line from sliding through the device when used as a float as clearly shown in FIG. 4.

Needless to say, the outer surfaces of the device may be colored as desired particularly if the device is to be used as a float or bobber.

Various modifications can be made within the scope of the inventive concept which is herein disclosed and/or claimed.

What I claim as my invention is:

1. A receptacle particularly intended to accommodate a fishhook when it is not in use, said receptacle comprising a pair of juxtaposed identical half-sections each including a semispherical component and a lateral extension integral with said component, said component and extension of each half-section having coplanar edges which abut corresponding edges of the other half-section when the receptacle is closed and which provide a rocking fulcrum between the extensions about which the receptacle may be opened, said fulcrum being located intermediate the ends of the extensions and outer portions of the extensions projecting beyond the fulcrum constituting finger-pieces for opening the receptacle, said finger-pieces in the closed position of the receptacle having edges divergent from the fulcrum and the divergent edges abutting each other when the receptacle is open, said half-sections being provided with peripheral grooves located substantially at the junction of each component with its extension and on the component side of the fulcrum, and an endless resilient band positioned in said grooves whereby to bias the half-sections to the closed position.

* * * * *